US011806877B2

(12) United States Patent
Zhao et al.

(10) Patent No.: US 11,806,877 B2
(45) Date of Patent: Nov. 7, 2023

(54) METHOD AND APPARATUS FOR ADJUSTING ROBOT MOTION PATH

(71) Applicant: ABB Schweiz AG, Baden (CH)

(72) Inventors: Fangfang Zhao, Shanghai (CN); Lei Mao, Shanghai (CN); Shaojie Cheng, Shanghai (CN)

(73) Assignee: ABB Schweiz AG, Baden (CH)

( * ) Notice: Subject to any disclaimer, the term of this patent is extended or adjusted under 35 U.S.C. 154(b) by 185 days.

(21) Appl. No.: 17/055,187

(22) PCT Filed: Feb. 8, 2018

(86) PCT No.: PCT/CN2018/075743
§ 371 (c)(1),
(2) Date: Nov. 13, 2020

(87) PCT Pub. No.: WO2019/153169
PCT Pub. Date: Aug. 15, 2019

(65) Prior Publication Data
US 2021/0220993 A1      Jul. 22, 2021

(51) Int. Cl.
*B25J 9/16* (2006.01)
*G05B 19/408* (2006.01)

(52) U.S. Cl.
CPC ........ *B25J 9/1664* (2013.01); *G05B 19/4083* (2013.01); *G05B 2219/37575* (2013.01);
(Continued)

(58) Field of Classification Search
CPC .......... G05B 19/41875; G05B 19/4083; G05B 2219/37576; G05B 2219/32222;
(Continued)

(56) References Cited

U.S. PATENT DOCUMENTS 5,903,459 A * 5/1999 Greenwood ......... G05B 19/401
700/109
6,740,534 B1   5/2004 Adams, III et al.
(Continued)

FOREIGN PATENT DOCUMENTS

CN    103163837 A    6/2013
CN    103970071 A    8/2014
(Continued)

OTHER PUBLICATIONS

European Extended Search Report, issued by the European Patent Office, regarding corresponding patent application Serial No. EP18904927.3; dated Nov. 5, 2021; 11 pages.
(Continued)

*Primary Examiner* — Stephen Holwerda
(74) *Attorney, Agent, or Firm* — Greenberg Traurig LLP (57) ABSTRACT

Embodiments of present disclosure relate to adjusting a robot motion path. In the method for adjusting a robot motion path, a first processing procedure may be performed on a first workpiece to obtain a first product. Then, first process data may be obtained, where the first process data describes an attribute of the first processing procedure for obtaining the first product from the first workpiece. Next, based on the obtained first process data, a robot motion path of a second processing procedure that is to be performed on the first product by a robot may be adjusted. Further, embodiments of present disclosure provide apparatuses, systems, and computer readable media for adjusting a robot motion path.

19 Claims, 5 Drawing Sheets

300 ⤴

┌─ 310
PERFORME A FIRST PROCESSING PROCEDURE ON A FIRST WORKPIECE TO OBTAIN A FIRST PRODUCT

┌─ 320
OBTAIN FIRST PROCESS DATA THAT DESCRIBES AN ATTRIBUTE OF THE FIRST PROCESSING PROCEDURE FOR OBTAINING THE FIRST PRODUCT FROM THE FIRST WORKPIECE

┌─ 330
ADJUST, BASED ON THE FIRST PROCESS DATA, A ROBOT MOTION PATH OF A SECOND PROCESSING PROCEDURE THAT IS TO BE PERFORMED ON THE FIRST PRODUCT BY A ROBOT (52) U.S. Cl.
CPC .............. *G05B 2219/45096* (2013.01); *G05B 2219/50063* (2013.01); *G05B 2219/50087* (2013.01)

(58) Field of Classification Search
CPC ........... G05B 2219/32217; G05B 2219/37575; G05B 2219/45096; G05B 2219/50071; G05B 2219/50063; G05B 2219/50087; B25J 9/1656; B25J 9/1664; Y02P 90/02
See application file for complete search history.

(56) References Cited

U.S. PATENT DOCUMENTS

| | | | |
|---|---|---|---|
| 2003/0125829 A1* | 7/2003 | Kakino | G05B 19/4163 700/86 |
| 2009/0132080 A1* | 5/2009 | Glasser | G05B 19/401 700/193 |
| 2011/0153080 A1 | 6/2011 | Shapiro et al. | |
| 2018/0307197 A1* | 10/2018 | Masumiya | G05B 19/19 |

FOREIGN PATENT DOCUMENTS

| | | |
|---|---|---|
| CN | 104057290 A | 9/2014 |
| JP | H01246086 A | 10/1989 |
| JP | 2006130522 A | 5/2006 |
| WO | WO-2017085768 A1 * | 5/2017 ............. G05B 19/19 |

OTHER PUBLICATIONS

Powell, Mark A.; "Agile Edge Finishing System"; Finishing '95 Conference and Exposition; dated Sep. 18, 1995; pp. 621-638; USA.

Aurich, J.C. et al.; "Burrs-Analysis, control and removal"; CIRP Annals-Manufacturing Technology; Elsevier BV, NL, CH, FR; vol. 58, No. 2, Jan. 1, 2009; pp. 519-542.

Intellectual Property Office of the P.R. China, International Search Report & Written Opinion issued in corresponding Application No. PCT/CN2018/075743, dated Nov. 9, 2018, 9 pp.

* cited by examiner

METHOD AND APPARATUS FOR ADJUSTING ROBOT MOTION PATH

TECHNICAL FIELD

Example embodiments of the present disclosure generally relate to robot path planning, and more specifically, to methods, apparatuses, systems and computer readable media for adjusting a robot motion path based on process data in a manufacturing procedure.

BACKGROUND

With the development of computer and automatic control, robots have been widely used to manufacture various types of workpieces. Typically, a rough manufacturing procedure (such as an injection molding process, a mechanical process, and the like) may be performed on a rough workpiece to obtain a rough product. Then, robots may be used to handle the rough product in a precise manner to obtain a final product. However, there may be some differences between the real shape and the ideal shape of the rough product after the rough manufacturing procedure. At this point, if the rough product with the real shape is processed according to a robot motion path that is predefined based on the ideal shape, it may be possible that the final product cannot reach the expected shape and thus become a defective product.

There have been proposed several solutions for measuring the real shape of the rough product and adjusting the robot motion path based on the difference between the real shape and the ideal shape of the rough product. However, these solutions heavily rely on manual operations and cannot consider impacts of various steps performed during the rough manufacturing procedure. Therefore, how to adjust the robot motion path in a more effective and convenience manner becomes a focus.

SUMMARY

Example embodiments of the present disclosure provide solutions for adjusting a robot motion path.

In a first aspect, example embodiments of the present disclosure provide a method for adjusting a robot motion path. The method may comprise: performing a first processing procedure on a first workpiece to obtain a first product; obtaining first process data that describes an attribute of the first processing procedure for obtaining the first product from the first workpiece; and adjusting, based on the obtained first process data, a robot motion path of a second processing procedure that is to be performed on the first product. Usually, the process data (such as the pressure, the speed and so on) during the first processing procedure may control the shape of the first product that is generated from the first processing procedure. With these embodiments, the process data may be used to compensate an error, between the real shape and the ideal shape of the first product, caused by the process data. Especially, based on the process data, the robot motion path that is to be used in a subsequent second processing procedure may be adjusted to correct the error.

In some embodiments, the adjusting a robot motion path of a second processing procedure may comprise: generating a predicted model for the first product based on the obtained first process data; and adjusting the robot motion path based on a model difference between the predicted model and an ideal model of the first product. With these embodiments, a predicted model which has a predicted shape of the first product may be generated. Then, by comparing the predicted shape with an ideal shape indicated by the ideal model, the error caused by the process data in the first processing procedure may be determined. Then the robot motion path may be easily adjusted based on the result of the comparison.

In some embodiments, the generating a predicted model for the first product may comprise: obtaining a threshold process data associated with the first processing procedure; and generating the predicted model for the first product based on a difference between the obtained first process data and the threshold process data. In these embodiments, the threshold process data may indicate a boundary between the normal and the abnormal process data, wand may be determined based on historical experience. With these embodiments, whether the first processing procedure has introduced the error into the first product may be determined simply by a comparison between the process data and the threshold process data. Further, the predicted model may be determined accordingly.

In some embodiments, the adjusting the robot motion path based on a model difference may comprise: obtaining a predetermined motion path for the robot; and adjusting the predetermined motion path based on the model difference such that an error caused by the first process data on the first product in the first processing procedure is compensated in the second processing procedure. Here, the predetermined motion path is an ideal robot motion path for shaping the ideal first product into an ideal final product. As the model difference indicates a deviation between the real first product and the ideal first product, the predetermined motion path cannot be directly used to the first product, and the model difference may provide a convenient manner for adjusting the predetermined motion path.

In some embodiments, the adjusting the robot motion path may further comprise: obtaining ideal dimensions of a shape of the first product; obtaining measurement dimensions of the shape of the first product; and adjusting the robot motion path based on a dimension difference between the measurement dimensions and the ideal dimensions. Further than the process data, these embodiments also consider the real shape of the first product. By comparing the real shape and the ideal shape of the first product, a difference in the shapes may be determined for further adjusting the robot motion path. With these embodiments, the real shape of the first product may be considered as another aspect for adjusting the robot motion path, and thus the robot motion path may be adjusted in a more precious manner.

In some embodiments, the method may further comprise: in response to the dimension difference satisfying a predetermined condition, adjusting a first processing procedure that is to be performed on a second workpiece based on the difference. Further than providing adjustment to the robot motion path for the subsequent second processing procedure, the dimension difference may also provide a feedback to the previous first processing procedure. Then, the feedback may be used during performing the first processing procedure on other to-be-processed workpieces. With these embodiments, the first processing procedure may be gradually adjusted to match an ideal first processing procedure which may shape the to-be-procedure workpieces into the ideal first products.

In some embodiments, the first processing procedure may comprise a plurality of steps. At this point, the performing a first processing procedure may comprise performing the plurality of steps on the first workpiece to obtain the first product, and the first process data may describe attributes of the plurality of steps. With these embodiments, with respect to each of the plurality of steps comprised in the first processing procedure, individual process data relating to a corresponding attribute of the each step may be obtained for the first processing procedure. Therefore, the first processing procedure may be monitored and controlled in a fined granularity, which may further increase the accuracy for the adjusting.

In some embodiments, the method may further comprise performing the second processing procedure on the first product based on the adjusted robot motion path. Once the robot motion path is adjusted, the first product may be subjected to the second processing which is defined by the adjusted robot motion path. With these embodiments, the adjusted robot motion path may provide a motion path which is customized to the first product and correct the error in the first product.

In some embodiments, the method further comprises: obtaining a threshold process data associated with the first processing procedure; and in response to a difference between the first process data and the threshold process data satisfying a predetermined condition, adjusting a first processing procedure that is to be performed on a second workpiece based on the difference. Further than providing adjustment to the robot motion path for the subsequent second processing procedure, these embodiments may also provide a feedback to the previous first processing procedure. Then, the feedback may be used during performing the first processing procedure on other to-be-processed workpieces. With these embodiments, the first processing procedure may be gradually adjusted to match an ideal first processing procedure which may shape the to-be-procedure workpieces into the ideal first products.

In a second aspect, example embodiments of the present disclosure provide an apparatus for adjusting a robot motion path. The apparatus may comprise: a performing unit configured to perform a first processing procedure on a first workpiece to obtain a first product; an obtaining unit configured to obtain first process data that describes an attribute of the first processing procedure for obtaining the first product from the first workpiece; and an adjusting unit configured to adjust, based on the obtained first process data, a robot motion path of a second processing procedure that is to be performed on the first product by a robot.

In some embodiments, the adjusting unit may comprise: a generating unit configured to generate a predicted model for the first product based on the obtained first process data; and a path adjusting unit configured to adjust the robot motion path based on a model difference between the predicted model and an ideal model of the first product.

In some embodiments, the generating unit may comprise: a threshold obtaining unit configured to obtain a threshold process data associated with the first processing procedure; and a model generating unit configured to generate the predicted model for the first product based on a difference between the obtained first process data and the threshold process data.

In some embodiments, the adjusting unit may comprise: a path obtaining unit configured to obtain a predetermined motion path for the robot; and a path adjusting unit configured to adjust the predetermined motion path based on the model difference such that an error caused by the first process data on the first product in the first processing procedure is compensated in the second processing procedure.

In some embodiments, the path adjusting unit may comprise: an ideal dimension obtaining unit configured to obtain ideal dimensions of a shape of the first product; a measurement obtaining unit configured to obtain measurement dimensions of the shape of the first product; and the adjusting unit is further configured to adjust the robot motion path based on a dimension difference between the measurement dimensions and the ideal dimensions.

In some embodiments, the apparatus may further comprises a feedback unit configured to adjust a first processing procedure that is to be performed on a second workpiece based on the difference in response to the dimension difference satisfying a predetermined condition.

In some embodiments, the first processing procedure may comprise a plurality of steps; and the performing unit may be further configured to perform the plurality of steps on the first workpiece to obtain the first product. The first process data may describe attributes of the plurality of steps.

In some embodiments, the apparatus may further comprise: a second performing unit configured to perform the second processing procedure on the first product based on the adjusted robot motion path.

In some embodiments, the apparatus may further comprise: a threshold obtaining unit configured to obtain a threshold process data associated with the first processing procedure; and a feedback unit configured to, adjust a first processing procedure that is to be performed on a second workpiece based on the difference in response to a difference between the first process data and the threshold process data satisfying a predetermined condition.

In a third aspect, example embodiments of the present disclosure provide a system for adjusting a robot motion path. The system comprises: a computer processor coupled to a computer-readable memory unit, the memory unit comprising instructions that when executed by the computer processor implements the method for adjusting a robot motion path.

In a fourth aspect, example embodiments of the present disclosure provide a computer readable medium having instructions stored thereon, the instructions, when executed on at least one processor, cause the at least one processor to perform the method for adjusting a robot motion path.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

There have been proposed solutions for adjusting the robot motion path based on the difference between the real shape and the ideal shape of the rough product. However, these solutions depend on manual operations and cannot consider impacts of various steps performed during the rough manufacturing procedure. Therefore, how to adjust the robot motion path in a more effective and convenience manner becomes a focus. Even if the robot motion path may be adjusted, due to lack of feedback to the previous rough manufacturing procedure, the previous rough manufacturing procedure will continuously repeat its current operations and produce rough products not which fail to match the ideal rough product. Accordingly, it is also desired to provide a feedback to the previous rough processing procedure.

Figure 1:
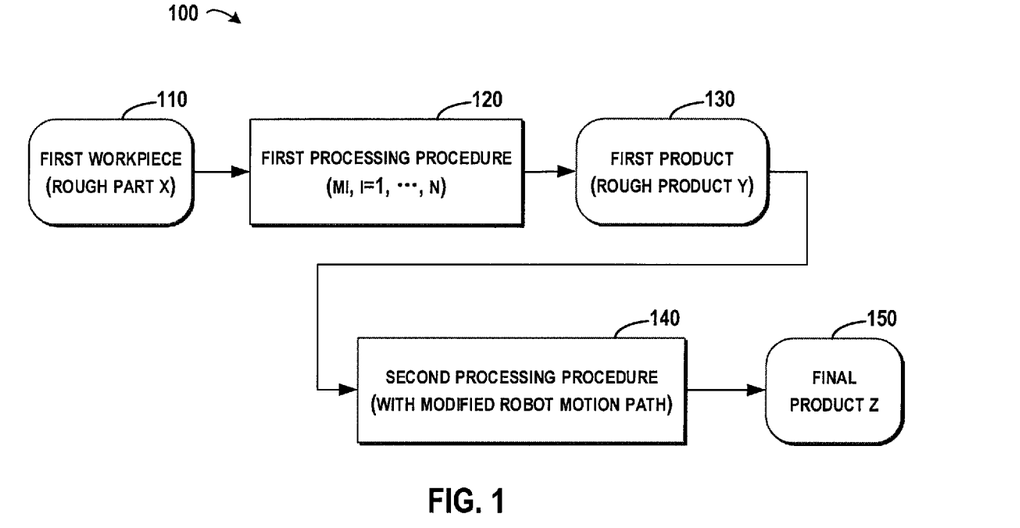
FIG. 1 illustrates a schematic diagram for adjusting a robot motion path in accordance with one technical solution.

In order to at least partially solve the above and other potential problems, a new method for adjusting a robot motion path is disclosed according to embodiments of the present disclosure. For the sake of description, embodiments of the present disclosure will be described in an environment of a factory, where final products are generated from rough parts. Reference will be made to FIG. 1 to provide a general description of environment of the present disclosure.

FIG. 1 illustrates a schematic diagram 100 for adjusting a robot motion path in accordance with one technical solution. As illustrated in FIG. 1, a first workpiece 110 such as a rough part X is obtained for producing the final product 150. Here, the first workpiece 110 may be subjected to a first processing procedure 120, where the first processing procedure may include one or more steps such as M1, M2, . . . , Mn. For example, the first processing procedure 120 may be the rough manufacturing procedure such as an injection molding process, or a mechanical process for shaping the first workpiece 110 into a first product 130 (such as a rough product Y). Then, the first product 130 may be subjected to a second processing procedure 140 with a modified robot motion path to obtain the final product 150 (such as Z). Here, the modified robot motion path is generated based on the prior solution which is based on a comparison between the real shape and ideal shape of the first product 130. However, the modified robot motion path is heavily depended on the manual work and thus results in high time and workload cost.

Figure 2:
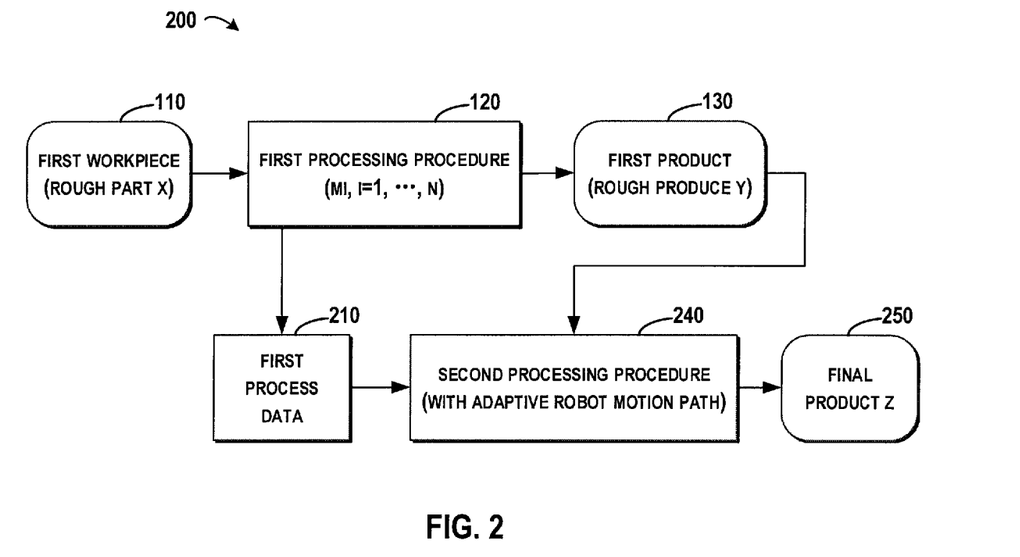
FIG. 2 illustrates a schematic diagram for adjusting a robot motion path based on process data in accordance with embodiments of the present disclosure.

Different from the solution in FIG. 1, the present disclosure provides a method for an adaptive robot motion path adjustment. FIG. 2 illustrates a schematic diagram 200 for adjusting a robot motion path based on process data in accordance with embodiments of the present disclosure. The blocks 110, 120 and 130 indicate similar meanings as those in FIG. 1, and the difference between FIG. 2 and FIG. 1 lies in that: process data 210 which indicates an attribute of the first processing procedure 120 may be obtained. Further, the obtained process data 210 may be used in determining an adaptive robot motion path for the second processing procedure 240. Then, the adaptive robot motion path may be run by the robot during the second processing procedure 240 to get a final product 250.

Usually, the process data 210 (such as the temperature, pressure and so on) during the first processing procedure 120 may control the shape and quality of the first product 130 that is generated in the first processing procedure 120. Then, in a subsequent processing procedure for obtaining the final produce 250, the process data 210 may be used to compensate the error between the real shape and ideal shape of the first product 130 caused by the process data. Hereinafter, how to produce a plastic part of a mouse by an injection molding process and a subsequent robot polishing procedure will be described as an example for illustration. In this example, the first processing procedure 120 may be the injection molding process, and the second processing procedure 240 may be a robot polishing procedure based on the adaptive robot motion path.

Figure 3:
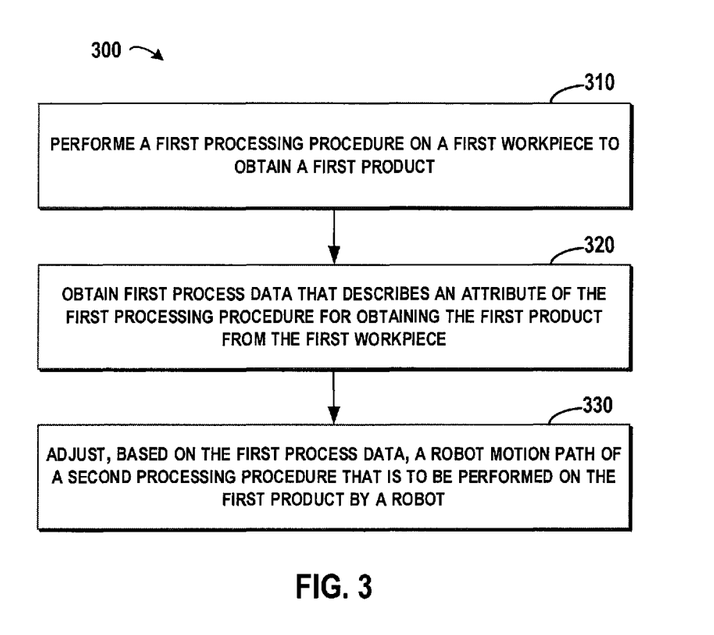
FIG. 3 illustrates a schematic flowchart of a method for adjusting a robot motion path based on process data in accordance with embodiments of the present disclosure.

FIG. 3 illustrates a schematic flowchart of a method 300 for adjusting a robot motion path based on process data 210 in accordance with embodiments of the present disclosure. At 310 of FIG. 3, a first processing procedure 120 may be performed on the first workpiece 110 to obtain a first product 130. For the purpose of illustration, the following paragraphs will describe details of the present disclosure by taking one step in the first processing procedure 120 as an example. Those skilled in the art may determine the details for implementing other steps in the first processing procedure 120 in a similar manner. In the example of producing the plastic part of the mouse, the raw plastic material may be heated and then melt plastic liquid may be injected into the mold during the first processing procedure 120.

At 320, the first process data 210 that describes the attribute of the first processing procedure 120 for obtaining the first product 130 from the first workpiece 110 may be determined. In this embodiment, the attribute may be the pressure and sensors may be deployed to measure the pressure between the mold and the injected mouse part. For example, multiple sensors may be deployed inside the mold to measure pressures at different positions of the mouse part. At this point, the pressure data may be considered the first process data 210. It is to be understood that, the pressure is just an example of the first process data 210. In another processing procedure with another type, the first press data 210 may indicate another attribute. For example, in cutting a workpiece into a cube, the first process data 210 may be a speed of the machine.

At 330, a robot motion path of a second processing procedure 240 that is to be performed on the first product 130 may be determined based on the first process data 210. Usually, if the process data 210 indicates that the pressure is higher than usual, it may be determined that a target area around the sensor position in the first product 130 may be thicker than usual, and then the robot motion path of the robot may be adjusted to polish the target area harder than usual to remove the thicker portion. With these embodiments, the process data 210 may be used to compensate thicker portion caused by the high pressure. Especially, based on the process data 210, the robot motion path that is to be used in a subsequent polish procedure may be adjusted to correct the error.

Figure 4:
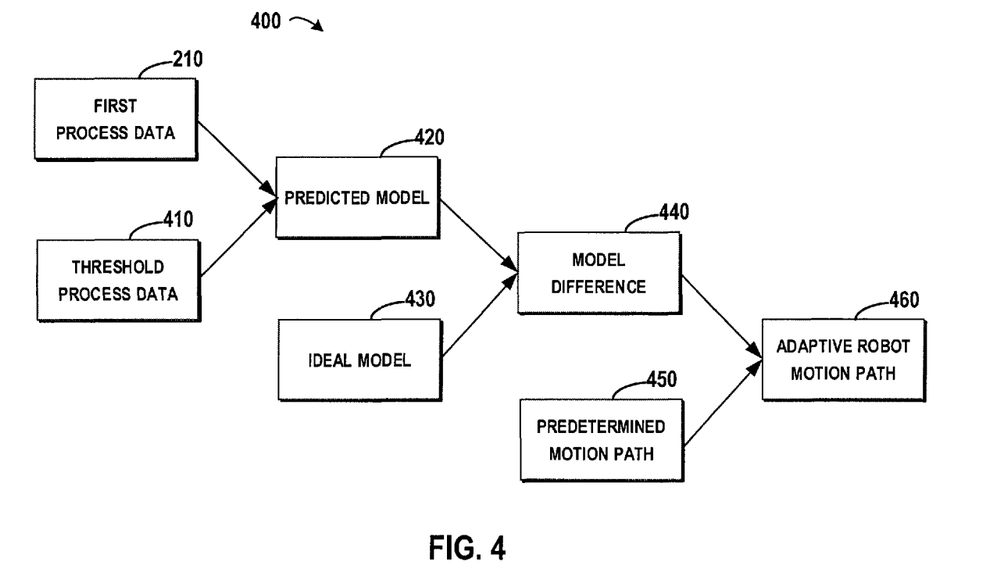
FIG. 4 illustrates a schematic diagram for determining an adaptive robot motion path in accordance with embodiments of the present disclosure.

Reference will be made to FIG. 4 to describe details about how to generate the adaptive robot motion path. FIG. 4 illustrates a schematic diagram 400 for determining an adaptive robot motion path 460 in accordance with embodiments of the present disclosure. In some embodiments, a predicted model 420 may be generated for the first product 130. Referring to FIG. 4, after the first process data 210 is obtained by the deployed sensor, a threshold process data 410 associated with the first processing procedure 120 may be obtained. Here, the threshold process data 410 may indicate a boundary between the normal and abnormal process data and may be determined based on historical experience. For example, if the historical experience indicates that the normal pressure at the mold is Presure0, then the value Presure0 may be used as the threshold process data 410.

Afterwards, the predicted model 420 may be generated for the first product 130 based on a difference between the first process data 210 and the threshold process data 410. Continuing the above example, if the first process data 210 indicates that the collected pressure is greater than the value Presure0, then it may be estimated that the predicated model 420 will be a little thicker than the ideal model 430 of the first product 130. Otherwise, if the first process data 210 indicates that the collected pressure is lower than the value Presure0, then it may be estimated that the predicated model 420 will be a little thinner than the ideal model 430 of the first product 130. With these embodiments, whether the first processing procedure 120 has introduced an error into the first product 130 may be determined simply by a comparison between the first process data 210 and the threshold process data 410. Further, the predicted model 420 may be determined conveniently.

In some embodiments, based on the extent of the difference between the first process data 210 and the threshold process data 410, the model difference 440 between the predicted model 420 and the ideal model 430 may be classified into various levels so as to indicate the error degree of the first product 130 in a quantized manner. With these embodiments, the error caused by the first process data 210 in the first processing procedure 120 may be determined. Then the robot motion path may be adjusted easily based on the error.

Still referring to FIG. 4, in order to obtain the adaptive the robot motion path, a predetermined motion path 450 for the robot may be obtained. Here, the predetermined motion path 450 is an ideal robot motion path for shaping the ideal first product into an ideal final product. If the first product 130 which has a different shape than the ideal shape is processed according to the predetermined motion path 450, clearly the final product will not match the ideal final product. For example, if the first product 130 is much thicker than the ideal one and the polishing procedure still removes a normal thickness of 0.25 mm from the surface of the first product 130, of course the thickness of the final product will be much thicker than the ideal one.

With these embodiments, as the model difference 440 indicates a deviation between the real first product and the ideal first product, the predetermined motion path may be effectively adjusted based on the model difference 440. At this point, the predetermined motion path 450 may be modified to reach the adaptive robot motion path 460 based on the model difference, such that the error caused by the first process data on the first product 130 in the first processing procedure 120 is compensated in the second processing procedure 240. Continuing the above example, the adaptive robot motion path may be set to another configuration which may remove 0.3 mm from the surface of the first product 130. With the adaptive robot motion path 460, the thicker portion in the first product 130 may be corrected to the ideal thickness by in the second processing procedure 240.

In some embodiments, when the model difference 440 between the predicted model 420 and the ideal model 430 is classified into various levels, the adaptive robot motion path 460 may also be adjusted according to the level. For example, the model difference 440 may be classified into {high, medium, low}, and the adaptive robot motion path 460 may also be classified into three levels {high, medium, low} to indicate that different thickness will be removed from the surface of the first product 130. Specifically, a high level may define that a thickness of 0.3 mm should be polished away, and a low level may define that a thickness of 0.26 mm should be polished away. With these embodiments, the robot motion path of the robot may be controlled in a more precious manner and thus ensure that the final product 250 may be similar as the ideal final product in the shape.

Figure 5:
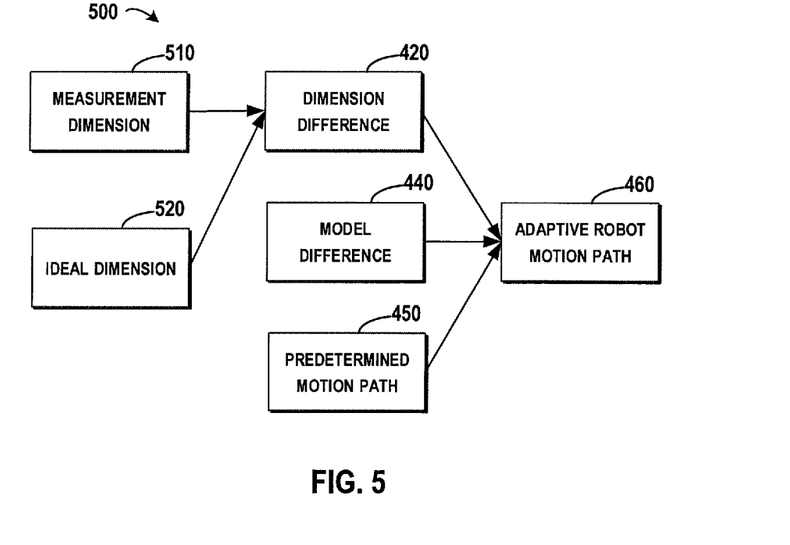
FIG. 5 illustrates a schematic diagram for determining an adaptive robot motion path in accordance with embodiments of the present disclosure.

In some embodiments, the real shape of the first product 130 may be utilized in further adjusting the robot motion path. FIG. 5 illustrates a schematic diagram 500 for determining an adaptive robot motion path 460 in accordance with embodiments of the present disclosure. As illustrated in FIG. 5, measurement dimensions 510 of the shape of the first product 130 may be obtained. Here, the measurement dimensions 510 may be collected by for example a camera or another tool. Further, ideal dimensions 520 of the shape of the first product 130 may be obtained. Here, the ideal dimensions 520 may be collected from for example a three dimension model of the ideal first product 130. Next, the adaptive robot motion path 460 may be obtained based on the predefined motion path 450 and a dimension difference between the measurement dimensions 510 and the ideal dimensions 520.

With these embodiments, a difference in the shape may be determined for further adjusting the robot motion path by comparing the real shape and the ideal shape. As a result, the real shape of the first product 130 may be considered as another aspect for adjusting the robot motion path, and thus the robot motion path may be adjusted in a more precious manner.

In some embodiments, the dimension difference may also provide a feedback to the previous first processing procedure. Specifically, if the dimension difference satisfies a predetermined condition (for example, if the dimension difference reaches a threshold value), the first processing procedure that is to be performed on a second workpiece may be adjusted based on the difference. Here, the feedback may be used during performing the first processing procedure on other to-be-processed workpieces. With these embodiments, the first processing procedure may be gradually adjusted to match an ideal first processing procedure which may shape the to-be-procedure workpieces into the ideal first products.

Although the above paragraphs describes how to adjusting the robot motion path based on process data 210 collected in a single step in the first processing procedure 120, in some embodiments, the first processing procedure 120 may comprise a plurality of steps. At this point, the plurality of steps may be performed on the first workpiece to obtain the first product 130, and the first process data 210 may describe attributes of the plurality of steps. With these embodiments, with respect to each of the plurality of steps comprised in the first processing procedure 120, individual process data relating to a corresponding attribute of the each step may be obtained. Here, the first process data 210 related to each of the plurality of steps may be used to adjust the robot motion path individually or in combination. Therefore, the first processing procedure 120 may be monitored and controlled in a fined granularity, which may further increase the accuracy for the adjusting.

In some embodiments, measurement dimensions 510 related to each of the plurality steps in the first processing procedure 120 may be obtained. Then, the measurement dimensions 510 may be utilized for generating respective feedbacks for respective steps in the first processing procedure 120.

Figure 6:
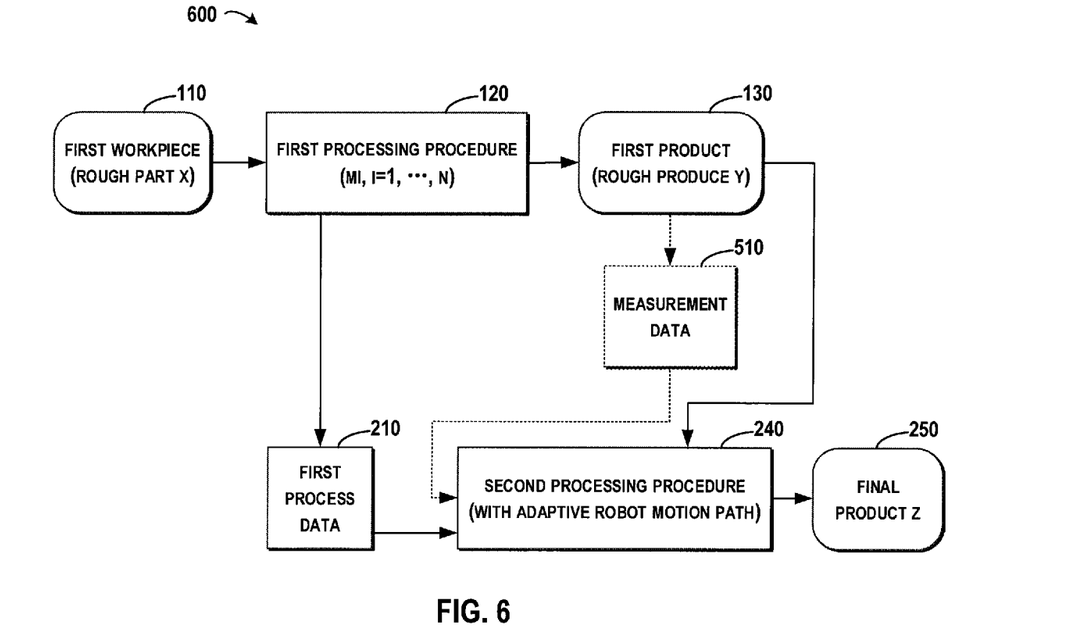
FIG. 6 illustrates a schematic diagram for preforming the second processing procedure based on the adaptive robot motion path in accordance with embodiments of the present disclosure.

In some embodiments, once the adaptive robot motion path 460 is determined, the second processing procedure 240 may be performed on the first product 130 based on the adaptive robot motion path 460, and reference will be made to FIG. 6 to describe details. FIG. 6 illustrates a schematic diagram 600 for preforming the second processing procedure 240 based on the adaptive robot motion path 460 in accordance with embodiments of the present disclosure. As illustrated in FIG. 6, the first workpiece 110 may be obtained for producing the final product 250. Here, the first workpiece 110 may be subjected to the first processing procedure 120, where the first processing procedure 120 may include one or more steps such as M1, M2, . . . , Mn for shaping the first workpiece 110 into the first product 130. Then, the first product 130 may be subjected to the second processing procedure 240 with the adaptive robot motion path 460, so as to obtain the final product 250.

In some embodiments, the adaptive robot motion path 460 may be generated based on the first process data 210 for the first processing procedure 120. In some embodiments, the adaptive robot motion path 460 may be generated based on the first process data 210 for the first processing procedure 120 as well as the measurement data 510 (illustrated in the dashed block) which indicates the measurement dimensions of the first product 130. With these embodiments, the adaptive robot motion path 460 may provide a motion path which is customized according to the first product 130 and correct the error in the first product 130 during the first processing procedure 120.

Figure 7:
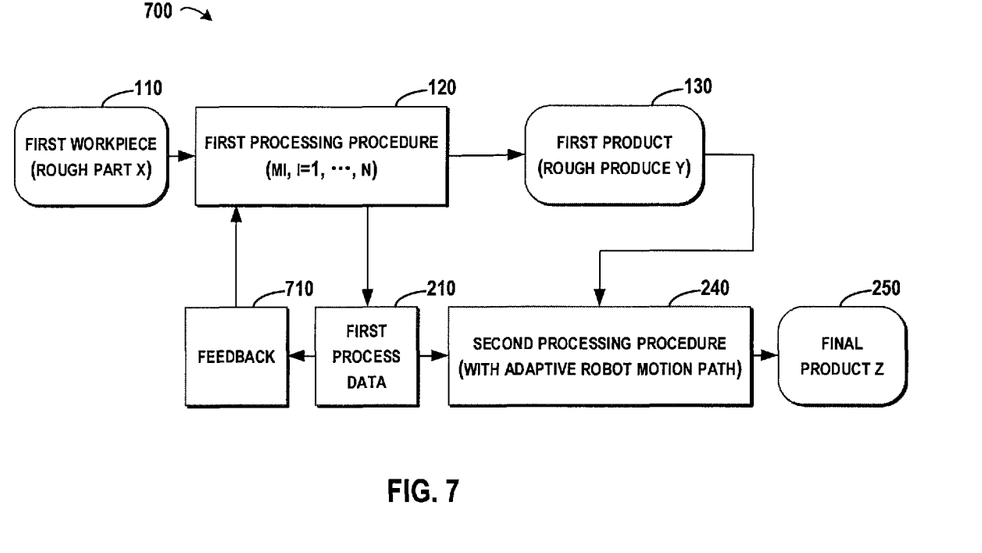
FIG. 7 illustrates a schematic diagram for providing a feedback to the first processing procedure based on the first process data in accordance with embodiments of the present disclosure.

In some embodiments, further than providing adjustment to the robot motion path for the subsequent second processing procedure 240, a feedback may be provided to the first processing procedure 120 to correct the potential operations that may cause the error in the shape of the first product 130. Reference will be made to FIG. 7 for details, which figure illustrates a schematic diagram 700 for providing a feedback to the first processing procedure 120 based on the first process data 210 in accordance with embodiments of the present disclosure.

In these embodiments, a threshold process data (not illustrated in FIG. 7) associated with the first processing procedure 120 may be obtained. Then, the threshold process data may be compared with the first process data 210. If a difference between the first process data 210 and the threshold process data satisfying a predetermined condition, a feedback 710 may be generated to update the first processing procedure 120. When a second workpiece inputted to produce a final product, the second workpiece may be subjected to the updated first processing procedure according to the feedback 710. With these embodiments, the first processing procedure 120 may be gradually adjusted to match the ideal first processing procedure which may shape the to-be-procedure workpieces into the ideal first product.

The embodiments of FIG. 7 may provide bi-direction adjustments. On one hand, the process data 210 may be utilized to generate the adaptive robot motion path 460 for the subsequent second processing procedure 240 run by the robot. On the other hand, the process data 210 may also be used to generate the feedback 710 for adjusting the first processing procedure 120 for the other to-be-processed workpieces. With these embodiments, the whole manufacturing procedure including the first processing procedure 120 and the second processing procedure 240 may be corrected to ensure that the final product 250 is as close to the ideal final product as possible.

Figure 8:
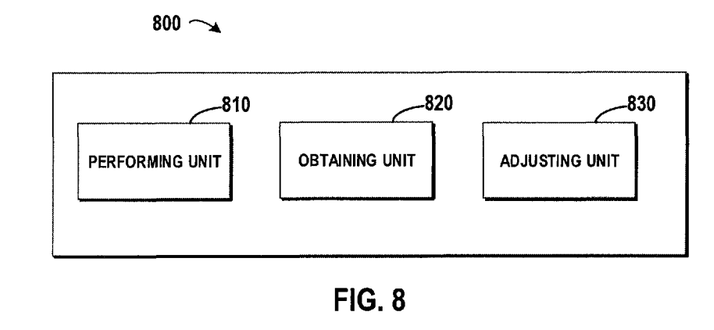
FIG. 8 illustrates a schematic diagram of an apparatus adjusting a robot motion path based on process data in accordance with embodiments of the present disclosure.

In some embodiments of the present disclosure, an apparatus for adjusting a robot motion path is provided. FIG. 8 illustrates a schematic diagram of an apparatus 800 for adjusting a robot motion path in accordance with embodiments of the present disclosure. As illustrated in FIG. 8, the apparatus may comprise: a performing unit 810 configured to perform a first processing procedure on a first workpiece to obtain a first product; an obtaining unit 820 configured to obtain first process data that describes an attribute of the first processing procedure for obtaining the first product from the first workpiece; and an adjusting unit 830 configured to adjust, based on the obtained first process data, a robot motion path of a second processing procedure that is to be performed on the first product by a robot.

Figure 9:
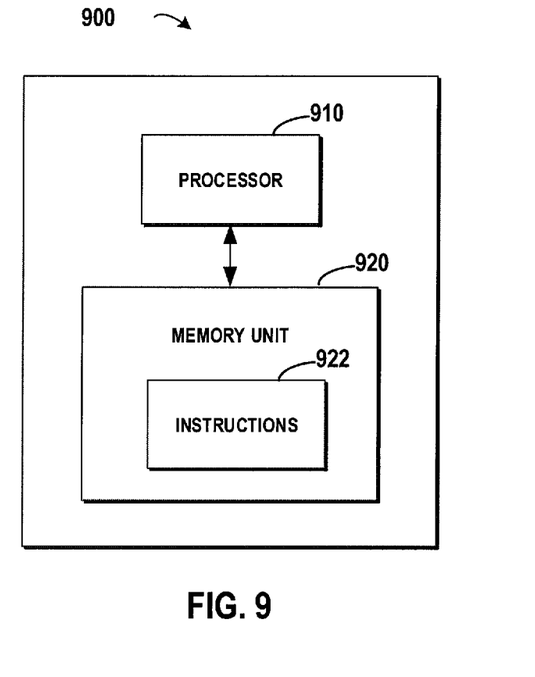
FIG. 9 illustrates a schematic diagram of a system for adjusting a robot motion path based on process data in accordance with embodiments of the present disclosure.

In some embodiments of the present disclosure, a system for adjusting a robot motion path is provided. FIG. 9 illustrates a schematic diagram of a system 900 for adjusting a robot motion path in accordance with embodiments of the present disclosure. As illustrated in FIG. 9, the system 900 may comprise a computer processor 910 coupled to a computer-readable memory unit 920, and the memory unit 920 comprises instructions 922. When executed by the computer processor 910, the instructions 922 may implement the method for adjusting a robot motion path as described in the preceding paragraphs, and details will be omitted hereinafter.

In some embodiments of the present disclosure, a computer readable medium for adjusting a robot motion path is provided. The computer readable medium has instructions stored thereon, and the instructions, when executed on at least one processor, may cause at least one processor to perform the method for adjusting a robot motion path as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for adjusting a robot motion path, comprising:
   performing a first processing procedure on a first workpiece to obtain a first product,
      wherein the first processing procedure comprises shaping the first workpiece into the first product;
   obtaining first process data that describes an attribute of the first processing procedure for obtaining the first product from the first workpiece, wherein the first process data is obtained during the shaping of the first workpiece into the first product;
   generating a predicted model for obtaining the first product based on the obtained first process data;
   determining a model difference between the predicted model and an ideal model of the first product;
   classifying the model difference into one of a plurality of defined different thickness removal classification levels; and
   adjusting the robot motion path based on the one of the plurality of defined different thickness removal classification levels of the model difference between the predicted model and the ideal model of the first product.

2. The method of claim 1, wherein the generating a predicted model for the first product comprises:
   obtaining a threshold process data associated with the first processing procedure; and
   generating the predicted model for the first product based on a difference between the obtained first process data and the threshold process data.

3. The method of claim 1, wherein the adjusting the robot motion path based on the model difference comprises:
   obtaining a predetermined motion path for the robot; and
   adjusting the predetermined motion path based on the model difference such that an error caused by the first process data on the first product in the first processing procedure is compensated in a second processing procedure.

4. The method of claim 1, wherein the adjusting the robot motion path further comprises:
   obtaining ideal dimensions of a shape of the first product;
   obtaining measurement dimensions of the shape of the first product; and
   adjusting the robot motion path based on the defined thickness removal classification level, and a dimension difference between the measurement dimensions and the ideal dimensions.

5. The method of claim 4, further comprising:
   in response to the dimension difference satisfying a predetermined condition, adjusting a first processing procedure that is to be performed on a second workpiece based on the difference.

6. The method of claim 1, wherein the first processing procedure comprises a plurality of acts; and
   wherein the performing a first processing procedure comprises performing the plurality of acts on the first workpiece to obtain the first product, and the first process data describing attributes of the plurality of acts.

7. The method of claim 1, further comprising:
   performing a second processing procedure on the first product based on the adjusted robot motion path.

8. The method of claim 1, further comprising:
obtaining a threshold process data associated with the first processing procedure; and
in response to a difference between the first process data and the threshold process data satisfying a predetermined condition, adjusting a first processing procedure that is to be performed on a second workpiece based on the difference.

9. An apparatus for adjusting a robot motion path, comprising:
a performing unit configured to perform a first processing procedure on a first workpiece to obtain a first product, wherein the first processing procedure comprises shaping the first workpiece into the first product;
an obtaining unit configured to obtain first process data that describes an attribute of the first processing procedure for obtaining the first product from the first workpiece, determine a model difference between a predicted model and an ideal model for obtaining the first product and classify the model difference into one of a plurality of defined thickness removal classification levels, wherein the first process data is obtained during the shaping of the first workpiece into the first product; and
an adjusting unit configured to adjust, based on the obtained first process data and the one of the plurality of levels, a robot motion path of a second processing procedure that is to be performed on the first product by a robot.

10. The apparatus of claim 9, wherein the adjusting unit comprises:
a generating unit configured to generate the predicted model for the first product based on the obtained first process data; and
a path adjusting unit configured to adjust the robot motion path based on the model difference and classification level.

11. The apparatus of claim 10, wherein the generating unit comprises:
a threshold obtaining unit configured to obtain a threshold process data associated with the first processing procedure; and
a model generating unit configured to generate the predicted model for the first product based on a difference between the obtained first process data and the threshold process data.

12. The apparatus of claim 10, wherein the adjusting unit comprises:
a path obtaining unit configured to obtain a predetermined motion path for the robot; and
a path adjusting unit configured to adjust the predetermined motion path based on the model difference such that an error caused by the first process data on the first product in the first processing procedure is compensated in the second processing procedure.

13. The apparatus of claim 9, wherein the path adjusting unit comprises:
an ideal dimension obtaining unit configured to obtain ideal dimensions of a shape of the first product;
a measurement obtaining unit configured to obtain measurement dimensions of the shape of the first product; and
the adjusting unit is further configured to adjust the robot motion path based on a dimension difference between the measurement dimensions and the ideal dimensions.

14. The apparatus of claim 13, further comprising:
a feedback unit configured to adjust a first processing procedure that is to be performed on a second workpiece based on the difference in response to the dimension difference satisfying a predetermined condition.

15. The apparatus of claim 9, wherein the first processing procedure comprises a plurality of operations; and
wherein the performing unit is further configured to perform the plurality of operations on the first workpiece to obtain the first product, and the first process data describing attributes of the plurality of operations.

16. The apparatus of claim 9, further comprising:
a second performing unit configured to perform the second processing procedure on the first product based on the adjusted robot motion path.

17. The apparatus of claim 9, further comprising:
a threshold obtaining unit configured to obtain a threshold process data associated with the first processing procedure; and
a feedback unit configured to adjust a first processing procedure that is to be performed on a second workpiece based on the difference in response to a difference between the first process data and the threshold process data satisfying a predetermined condition.

18. A system for adjusting a robot motion path, comprising:
a computer processor coupled to a computer-readable memory unit, the memory unit comprising instructions on a non-transitory computer readable medium that when executed by the computer processor implements at least the following:
perform a first processing procedure on a first workpiece to obtain a first product,
wherein the first processing procedure comprises shaping the first workpiece into the first product;
obtain first process data that describes an attribute of the first processing procedure for obtaining the first product from the first workpiece, wherein the first process data is obtained during the shaping of the first workpiece into the first product;
determine a model difference between a predicted model and an ideal model for obtaining the first product and classify the model difference into one of a plurality of defined thickness removal classification levels; and
adjust, based on the obtained first process data and the one of the plurality of levels, a robot motion path of a second processing procedure that is to be performed on the first product by a robot.

19. A non-transitory computer readable medium having instructions stored thereon, the instructions, when executed on at least one processor, cause the at least one processor to implement at least:
perform a first processing procedure on a first workpiece to obtain a first product,
wherein the first processing procedure comprises shaping the first workpiece into the first product;
determine first process data that describes an attribute of the first processing procedure for obtaining the first product from the first workpiece, wherein the first process data is obtained during the shaping of the first workpiece into the first product;
determine a model difference between a predicted model and an ideal model for obtaining the first product and classify the model difference into one of a plurality of defined thickness removal classification levels; and adjust, based on the obtained first process data and classification level, a robot motion path of a second processing procedure that is to be performed on the first product by a robot.

<p align="center">* * * * *</p>